(12) United States Patent
Lang et al.

(10) Patent No.: US 12,255,498 B2
(45) Date of Patent: Mar. 18, 2025

(54) ROTOR HAVING A SUPPORT DEVICE, ELECTRIC MACHINE HAVING A ROTOR, AND MOTOR VEHICLE HAVING AN ELECTRIC MACHINE

(71) Applicant: Bayerische Motoren Werke Aktiengesellschaft, Munich (DE)

(72) Inventors: Markus Lang, Munich (DE); Jerome Ragot, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 228 days.

(21) Appl. No.: 18/072,799

(22) Filed: Dec. 1, 2022

(65) Prior Publication Data
US 2023/0179047 A1 Jun. 8, 2023

(30) Foreign Application Priority Data
Dec. 2, 2021 (DE) ...................... 10 2021 131 729.0

(51) Int. Cl.
*H02K 1/28* (2006.01)
*H02K 1/24* (2006.01)

(52) U.S. Cl.
CPC ................. *H02K 1/28* (2013.01); *H02K 1/24* (2013.01)

(58) Field of Classification Search
CPC ........ H02K 1/28; H02K 1/24; H02K 2205/12; H02K 3/527
See application file for complete search history.

(56) References Cited

U.S. PATENT DOCUMENTS

| 2002/0171304 | A1 | 11/2002 | Laskaris et al. |
| 2003/0042818 | A1 | 3/2003 | Tornquist et al. |
| 2018/0109170 | A1 | 4/2018 | Park et al. |
| 2019/0296600 | A1 | 9/2019 | Mikati et al. |
| 2020/0136483 | A1 | 4/2020 | Duricic et al. |
| 2021/0050761 | A1* | 2/2021 | Loos ........................ H02K 1/24 |

(Continued)

FOREIGN PATENT DOCUMENTS

| DE | 602 10 704 T2 | 3/2007 |
| DE | 602 21 540 T2 | 4/2008 |
| DE | 10 2017 218 111 A1 | 4/2018 |

(Continued)

OTHER PUBLICATIONS

German-language Search Report issued in German Application No. 10 2021 131 729.0 dated Aug. 4, 2022 with partial English translation (10 pages).

*Primary Examiner* — Thomas Truong
(74) *Attorney, Agent, or Firm* — Crowell & Moring LLP

(57) ABSTRACT

A rotor for an electric machine includes a rotor main body which has at least two poles between which in the circumferential direction of the rotor is disposed at least one pole gap, and a rotor shaft which is coupled in a rotationally fixed manner to the rotor main body. The rotor has a support device which has a covering body that is configured for covering at least regions of an end side of the rotor main body. The support device has an annular body, which is different from the covering body, and in the direction of radial extent of the rotor is braced in relation to the rotor main body, on the one hand, and in the direction of radial extent of the rotor is braced in relation to the covering body, on the other hand.

8 Claims, 3 Drawing Sheets

(56) References Cited

U.S. PATENT DOCUMENTS

2022/0131429 A1* 4/2022 Bach .................... H02K 15/022

FOREIGN PATENT DOCUMENTS

| DE | 10 2016 223 509 A1 | 5/2018 |
| --- | --- | --- |
| DE | 10 2017 210 742 A1 | 12/2018 |
| DE | 10 2018 128 521 A1 | 5/2020 |
| DE | 10 2020 127 928 A1 | 4/2022 |
| EP | 2 717 435 A2 | 4/2014 |
| JP | 9-233785 A | 9/1997 |
| WO | WO 2012/007920 A1 | 1/2012 |

* cited by examiner

ROTOR HAVING A SUPPORT DEVICE, ELECTRIC MACHINE HAVING A ROTOR, AND MOTOR VEHICLE HAVING AN ELECTRIC MACHINE

CROSS REFERENCE TO RELATED APPLICATION

This application claims priority under 35 U.S.C. § 119 from German Patent Application No. DE 10 2021 131 729.0, filed Dec. 2, 2021, the entire disclosure of which is herein expressly incorporated by reference.

BACKGROUND AND SUMMARY

The invention relates to a rotor for an electric machine, having a rotor main body which has at least two poles between which in the circumferential direction of the rotor is disposed at least one pole gap, and having a rotor shaft which is coupled in a rotationally fixed manner to the rotor main body. Further aspects of the invention relate to an electric machine having such a rotor and to a motor vehicle having an electric machine.

In order to improve the maximum output as well as the continuous performance of electric motors, various known approaches can be derived from the prior art. For example, the continuous output of so-called PSM machines can be increased in that the rotors of the latter are cooled by means of a fluid, in particular a coolant. Here, a flow of the fluid usually passes through a rotor shaft of the respective rotor, heat being created in the operation of the PSM machine being discharged from the rotor by means of the fluid along a heat path from respective magnets of the rotor as well as by way of respective laminated cores of the rotor and by way of the rotor.

Depending on the design embodiment of the electric motor, another approach lies in using so-called rare earth magnets, which have a high energy density, as permanent magnets. However, there is a heavy environmental impact associated with the extraction of rare earth products.

In order to meet increasing quality requirements set for electric machines, the dimensional stability of rotors of the electric machines at high rotor rotating speeds has to be ensured, for example.

It is an object of the present invention to provide a rotor which is dimensionally stable particularly at high rotor rotating speeds, an electric machine having such a rotor, as well as a motor vehicle having an electric machine of this type.

This object is achieved by a rotor, by an electric machine having the rotor, and by a motor vehicle having the electric machine, in accordance with the independent claims. Advantageous design embodiments with expedient refinements of the invention are set forth in the dependent claims.

A first aspect of the invention relates to a rotor for an electric machine, having a rotor main body which has at least two poles between which in the circumferential direction of the rotor is disposed at least one pole gap, and having a rotor shaft which is coupled in a rotationally fixed manner to the rotor main body. The rotor main body can have a laminated rotor core, wherein the laminated rotor core can have a salient pole geometry. Furthermore, the rotor main body can have an end-winding support structure. The rotor can in particular be configured as a salient pole rotor and have a rotor yoke with projecting salient poles. A salient pole can have a pole body which projects radially from the rotor yoke and about which a rotor winding can be disposed, for example. The end-winding support structure serves for configuring, guiding and supporting the end winding of the rotor winding.

The pole can comprise a pole core and a pole shoe which is connected, for example integrally connected, to the pole core. The rotor can comprise a plurality of poles having a corresponding plurality of pole cores, and of pole shoes connected to the latter, and of windings, in particular copper wire windings, received on the poles.

According to the invention, it is provided that the rotor comprises a support device which has a covering body that is configured for covering at least regions of an end side of the rotor main body and has an annular body which is different from the covering body and in the direction of radial extent of the rotor is braced in relation to the rotor main body, for example in relation to the end-winding support structure thereof, on the one hand, and in the direction of radial extent of the rotor is braced in relation to the covering body, on the other hand. The covering body and the annular body thus form individual parts of the covering device that are in each case configured separately from one another and are mutually braced, in particular mutually compressed, and as a result are joined together. As a result, the covering body and the annular body can conjointly form the covering device. The covering body can preferably be configured in the form of a lid. The annular body can preferably be configured as a hollow-cylindrical ring and in this way be particularly easy to assemble. The annular body, while configuring an interference fit, can particularly preferably be pushed onto the covering body and/or the rotor main body, for example against the end-winding support structure of the latter.

A plurality of advantages can be achieved as a result of the split embodiment of the support device, in which the annular body, which may also be referred to as the support ring or as the annular region of the support device, and the covering body, which may also be referred to as the lid region of the support device, are able to be configured as mutually different parts and joined together. In this way, any potential axial deformation of the lid region, thus the deformation of the latter in the direction of axial extent of the rotor, as a consequence of stress by centrifugal forces, can be avoided, for example. Moreover, by means of an additional support structure which supports the annular body in the direction of radial extent and which in the direction of axial extent can overlap the at least one pole gap, there is the possibility of additionally reducing potential stress to the annular body during the operation of the rotor, thus during the rotation of the latter, and of optionally also configuring the annular body with a lesser wall thickness (in particular in the direction of radial extent of the rotor) without a supporting effect of an end winding of the rotor by way of the rotor main body (winding support structure) being reduced. By virtue of less mechanical stress to the covering body it is furthermore possible for potential axial bores to be placed in order for a desired quality of rotor balancing to be adjusted. These advantages contribute toward improved quality of the rotor and thus of an electric machine having the rotor.

The invention is based on the concept that, as a result of a disadvantageous embodiment of the support device as an integrated component, in which the annular body and the covering body are integrally connected to one another, an unfavorable mechanical coupling of mechanical stress of the annular body and of the covering body that is caused during operation may arise. This leads to the lid region, under the stress of centrifugal forces, being able to be deformed in an outward manner from a rotation axis of the rotor in the direction of radial extent of the rotor, as a result of which quality deficiencies may arise because potential spacings from adjacent components of the electric machine, for example from a stator and/or a housing, may be reduced. A corresponding variation of the spacings has then to be taken into account in the design of the electric machine, or e-machine for short, this potentially causing an increase in terms of installation space. Moreover, an undesirable misalignment of a cylindrical support face, on which the support device can be press-fitted with the rotor main body, may arise. This can lead to dissimilar interference-fit values between the support device and the rotor main body being configured in the circumferential direction of the rotor. As a result, high local surface pressures and thus impermissible stress can arise in regions. Owing to the high loads and deformations of the annular body it is not possible for this component to be also used as a balancing body so that, in the case of an integral design embodiment of the support device, only the rotor main body, or the laminated core, respectively, can be utilized as a balancing body. However, this represents a disadvantageous intervention in terms of the mechanical output of the electric machine, and leads to increased wear and tear in tools, for example in drill bits, which are used for achieving the desired quality of balancing. The concept of the invention lies in particular in being able to avoid these disadvantages by way of the design embodiment of the annular body and of the covering body each as an individual part.

In one advantageous refinement of the invention, the covering body has a through opening, the rotor shaft at least in regions being guided through the latter. This permits particularly large regions of the end side to be covered by means of the covering body, specifically because the covering body can be configured so as to be annular, as a result being able to cover particularly large areas of the end side.

In one further advantageous refinement of the invention, the covering body has an annular central region which circumferentially encircles the through opening, and at least two covering regions that in the direction of radial extent of the rotor protrude from the central region, a recess of the covering body in the circumferential direction of the rotor being disposed between the at least two covering regions, and one covering region of the latter in the direction of the axial extent of the rotor at least in regions covering in each case one of the poles. This is advantageous because, as a result of the recess, a lower rotary inertia of the covering body can be achieved, as a result of which the rotor, in the intended use thereof as a component of the electric machine, can be more rapidly accelerated.

In one further advantageous refinement of the invention, the covering body has at least one protrusion which is oriented in the direction of axial extent of the rotor and in the direction of the rotor main body and which is disposed on at least one of the covering regions and introduced into at least one corresponding receptacle opening of the rotor main body. As a result, a composite of the rotor main body and the support device is particularly highly resistant in relation to deformation. The receptacle opening can preferably be disposed on a pole shoe of the rotor main body that in the direction of radial extent of the rotor lies outside. As a result, centrifugal forces during the operation of the rotor can be transmitted between the covering body and the rotor main body particularly far toward the outside in the direction of radial extent, and a particularly advantageous introduction of force can be effected in this way. For example, the winding support structure of the rotor main body can be configured for minimizing at least one end winding of the rotor in relation to sliding off in the direction of radial extent due to centrifugal forces during the operation of the rotor.

In one further advantageous refinement of the invention, the covering body has at least one reinforcement structure which divides the recess between the at least two covering regions into at least two recess sub-regions, and in the direction of radial extent of the rotor is braced with the annular body. This is advantageous because the at least one reinforcement structure in this way enables the annular body to be effectively supported in the region of the at least one pole gap. The rotor preferably has a plurality of pole gaps, and the reinforcement structure has a likewise large number of reinforcement structures. In this way, one of the reinforcement structures in the direction of axial extent can in each case overlap one of the pole gaps, as a result of which a particular uniform support of the annular body on the respective reinforcement structures can take place.

In one further advantageous refinement of the invention, the at least one reinforcement structure in a section plane oriented along a rotation axis of the rotor has an L-shaped cross section. The L-shaped cross section permits an advantageous spring action of the reinforcement structure in the direction of radial extent of the rotor. This spring action can facilitate assembling, in particular joining the covering body to the annular body.

In one further advantageous refinement of the invention, the at least two covering regions in the direction of radial extent of the rotor are spaced apart from the annular body, and the covering body is supported on the annular body by way of the at least one reinforcement structure. This particularly advantageously contributes toward joining the covering body to the annular body with particularly little complexity.

A second aspect of the invention relates to an electric machine for a motor vehicle, having at least one rotor according to the first aspect of the invention. The electric machine can be operated in a particularly fail-safe manner at high rotor rotating speeds.

In one advantageous refinement of the invention, the electric machine is configured as a current-excited synchronous machine. In other words, the rotor can be configured in particular as an SSM (separately excited synchronous machine) rotor, thus as a rotor which is designed as a rotor of an electric machine configured as a current-excited synchronous machine.

A third aspect of the invention relates to a motor vehicle having at least one electric machine according to the second aspect of the invention, and/or having at least one rotor according to the first aspect of the invention.

The preferred embodiments proposed with reference to one of the aspects, and the advantages of the embodiments, apply in analogous manner to the respective other aspects of the invention, and vice versa.

The features and combinations of features mentioned above in the description, as well as the features and combinations of features mentioned hereunder in the description of the figures and/or shown individually in the figures, can be used not only in the respective combination set forth, but can also be used in other combinations or individually, without departing from the scope of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 5:
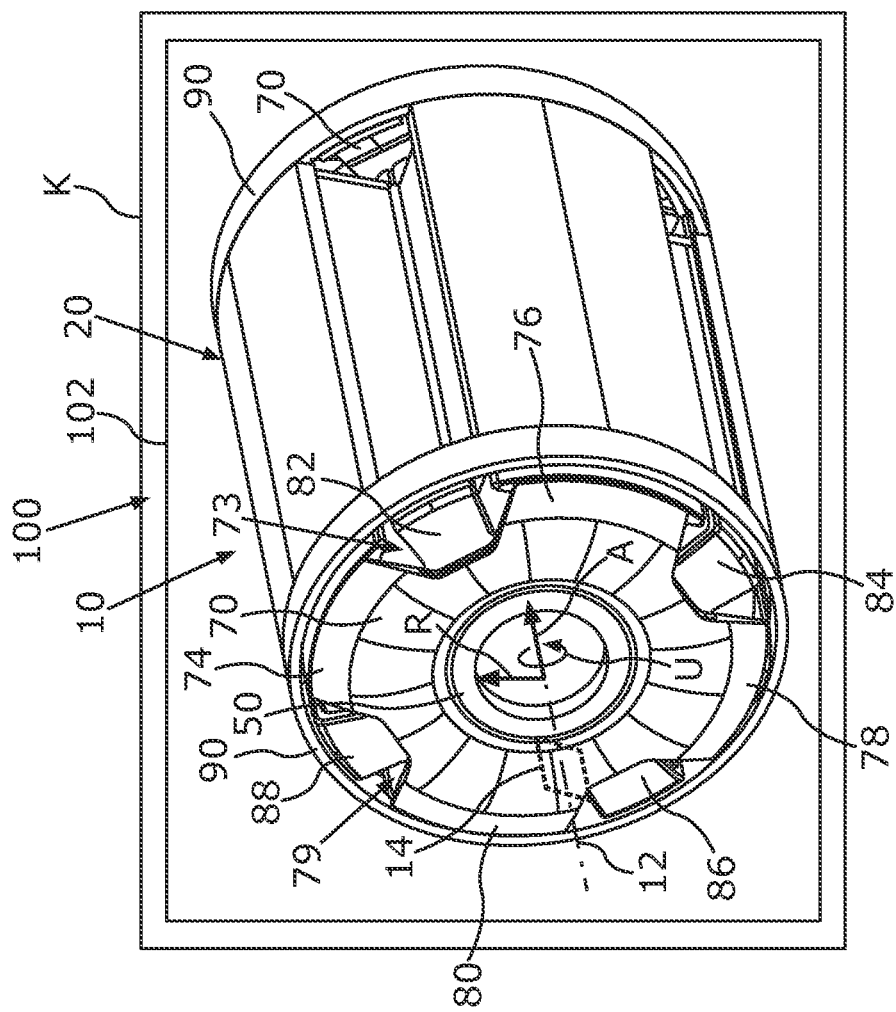
FIG. 5 shows an abstract of an illustration of a motor vehicle, of an electric machine, and of a stator of the electric machine, as well as a schematic perspective view of the rotor.

FIG. 5, in a highly abstract form, shows an illustration of a motor vehicle K, of an electric machine 100 of the motor vehicle K, of a stator 102 of the electric machine 100, and of a rotor 10 of the electric machine 100, which is shown in a schematic perspective view. The rotor 10 is mounted so as to be rotatable relative to the stator 102 about a rotation axis 12. The electric machine 100 presently is configured as a current-excited synchronous machine and serves as a traction machine of the motor vehicle K. A rotor shaft 50 of the rotor 10 is coupled in a rotationally fixed manner to a rotor main body 20 of the rotor 10. Likewise shown in FIG. 5 are directions which relate to the rotor 10 and are highlighted by respective arrows, specifically a direction of axial extent A, a direction of radial extent R oriented so as to be perpendicular to the latter, and a circumferential direction U.

Figure 1:
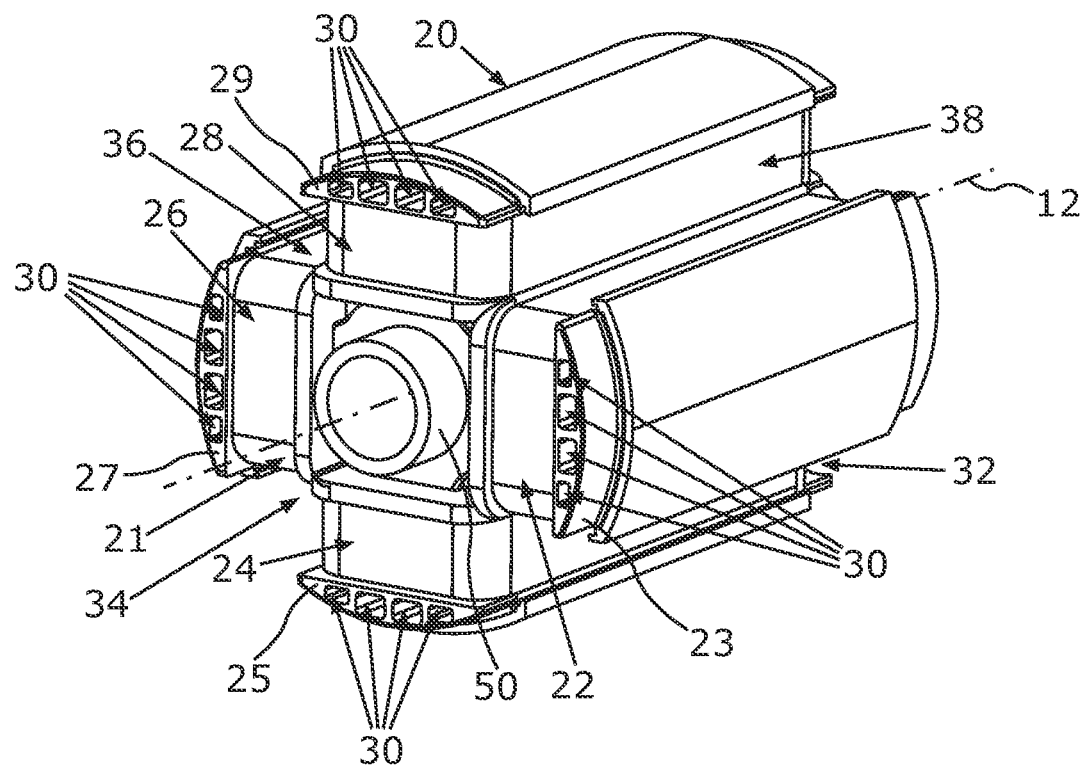
FIG. 1 is a schematic perspective illustration of a rotor main body and of a rotor shaft of the rotor for an electric machine, the rotor shaft being joined to the rotor.
Figure 2:
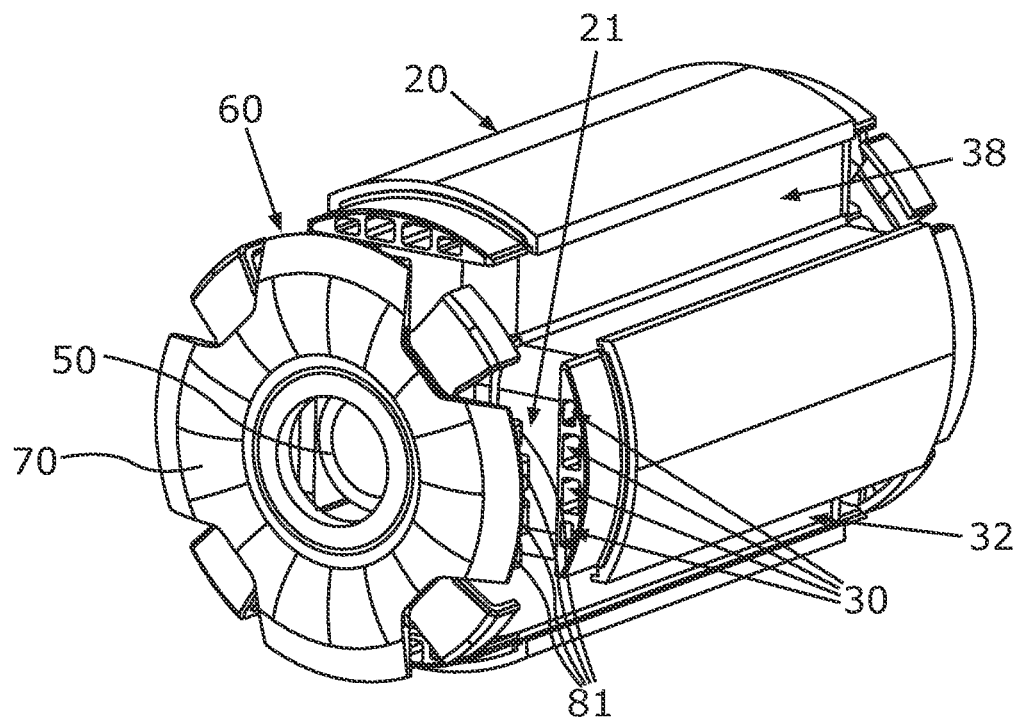
FIG. 2 is a further schematic perspective view of the rotor main body, of the rotor shaft and of a support device of the rotor, the support device being disassembled from the rotor main body and comprising a covering body and an annular body.
Figure 3:
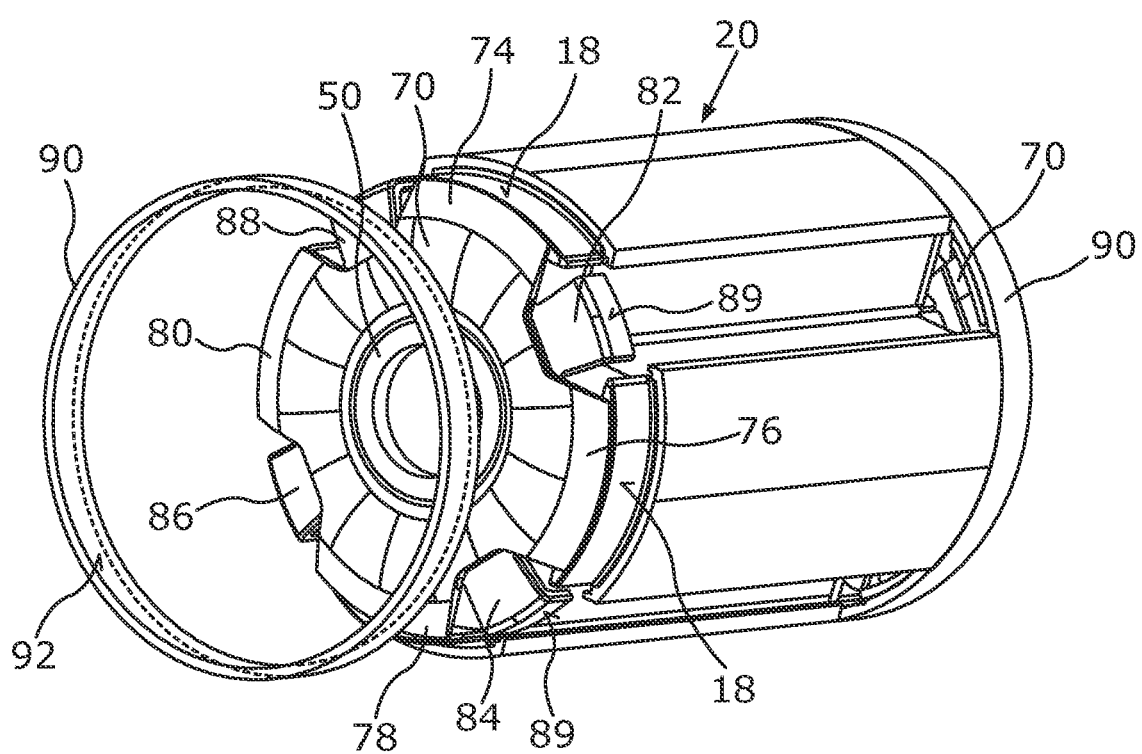
FIG. 3 is a schematic perspective illustration of the rotor, in which the covering body is assembled on the rotor main body, but the annular body is disassembled.

It can be seen by means of FIG. 1, but also by means of FIG. 2, FIG. 3 and FIG. 5, that the rotor main body 20 in the present variant has four poles 22, 24, 26, 28 having a respective pole shoe. Two of the poles 22, 24, 26, 28 in the circumferential direction U conjointly enclose in each case a right angle and in each case one of a total of four pole gaps 32, 34, 36, 38.

Figure 4:
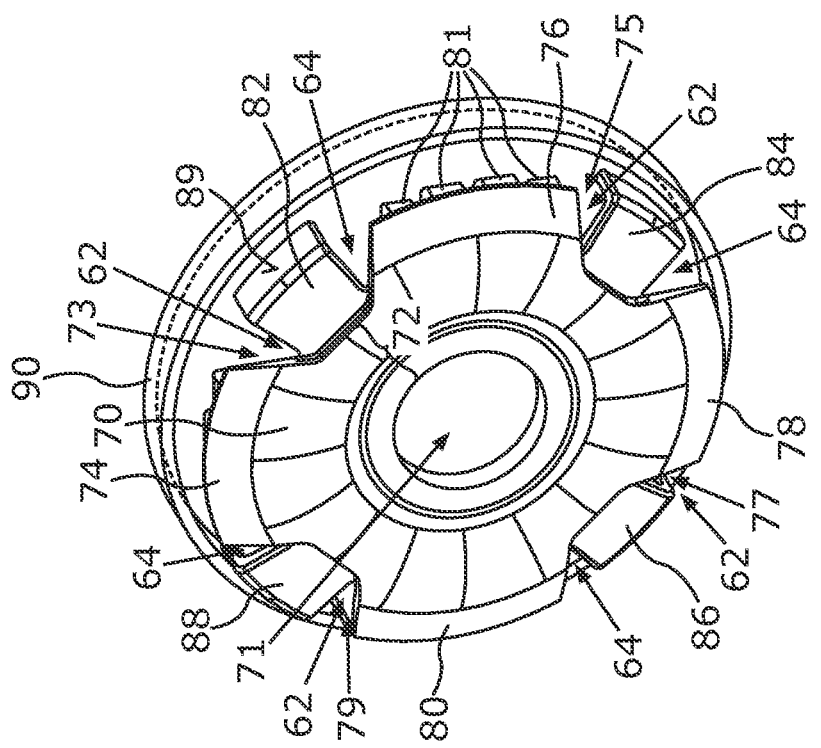
FIG. 4 is a schematic perspective view of the partially shown support device.

The rotor 10 comprises a support device 60 which is shown in detail in FIG. 4 and has a covering body 70, the latter being configured for covering at least regions of an end side 21 of the rotor main body 20, as can be seen by viewing FIG. 4 in conjunction with FIG. 1 and FIG. 2, for example. Moreover, the support device 60 has an annular body 90, which is different from the covering body 70. FIG. 3 in conjunction with FIG. 5 shows that the annular body 90 in the direction of radial extent R of the rotor 10 is braced in relation to the rotor main body 20, on the one hand, and in the direction of radial extent R of the rotor 10 is braced in relation to the covering body 70, on the other hand. In general, an annular body-proximal contact face 92 of the annular body 90, which in the direction of radial extent R lies inside and thus faces the rotation axis 12, can be braced with reinforcement structure-proximal contact faces 89 to be described hereunder, on the one hand, and with rotor main body-proximal contact faces 18, on the other hand. The annular body-proximal contact face 92 here represents a contact face that is assigned to the annular body 90, whereas the rotor main body-proximal contact faces 18 represent respective contact faces that are assigned to the rotor main body 20. In the present case, each of the poles 22, 24, 26, 28 is in each case assigned an outer support region 23, 25, 27, 29 having in each case one of the rotor main body-proximal contact faces 18. In other words, each of the poles 22, 24, 26, 28 has in each case one of the outer support regions 23, 25, 27, 29, wherein each of the support regions 23, 25, 27, 29 in turn has in each case one of the rotor main body-proximal contact faces 18.

It can likewise be seen by means of FIG. 4 that the covering body 70 has a through opening 71, the rotor shaft 50 at least in regions being guided through the latter, as is shown in FIG. 5, for example.

FIG. 4 moreover shows that the covering body 70 has an annular central region 72, which circumferentially surrounds the through opening 71 and in an encircling manner is thus closed in the circumferential direction U, and four covering regions 74, 76, 78, 80 that in the direction of radial extent R of the rotor 10 protrude from the central region 72, one recess 73, 75, 77, 79 of the covering body 70 in the circumferential direction U of the rotor 10 being in each case disposed between the covering regions 74, 76, 78, 80. Two of the covering regions 74, 76, 78, 80 enclose in each case one right angle and in each case one of the recesses 73, 75, 77, 79.

One of the covering regions 74, 76, 78, 80 in the direction of axial extent A of the rotor 10 covers in each case one of the poles 22, 24, 26, 28, as can be seen by means of FIG. 2, for example.

Moreover, the covering body 70 has a plurality of protrusions 81 which are oriented in the direction of axial extent A of the rotor 10 and in the direction of the rotor main body 20. In the present variant, four protrusions 81 are in each case disposed on one of the covering regions 74, 76, 78, 80 so that the covering body 70 presently has a total of 16 protrusions 81. In the completely assembled rotor 10, each of the protrusions 81 is introduced into in each case one corresponding receptacle opening 30 of the rotor main body 20, as can be seen when viewing FIG. 2 in conjunction with FIG. 5.

Moreover, the covering body 70 in the present variant has four reinforcement structures 82, 84, 86, 88, of which each one of the reinforcement structures 82, 84, 86, 88 divides in each case one of the recesses 73, 75, 77, 79 into in each case two recess sub-regions 62, 64. There are thus a total of eight recess sub-regions 62, 64. Each of the reinforcement structures 82, 84, 86, 88 in the direction of radial extent R of the rotor 10 is braced with the annular body 90. Each of the reinforcement structures 82, 84, 86, 88 is in each case assigned one of the reinforcement structure-proximal contact faces 89.

Each of the four reinforcement structures 82, 84, 86, 88 in a section plane 14, which is oriented along the rotation axis 12 of the rotor 10 and presently is shown only in FIG. 5, has an L-shaped cross section.

It can moreover be seen by means of FIG. 5 that the covering regions 74, 76, 78, 80 in the direction of radial extent R of the rotor 10, for example while configuring an interference fit, can be spaced apart from the annular body 90, and that the covering body 70 is supported on the annular body 90 by way of the at least one reinforcement structure 82, 84, 86, 88.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 Rotor
12 Rotation axis
14 Section plane
18 Rotor main body-proximal contact face
Rotor main body
21 End side
22 Pole
23 Outer support region
24 Pole
Outer support region
26 Pole
27 Outer support region
28 Pole
29 Outer support region
Receptacle opening
32 Pole gap
34 Pole gap
36 Pole gap
38 Pole gap
50 Rotor shaft
60 Support device
62 Recess sub-region
64 Recess sub-region
70 Covering body
71 Through opening
72 Central region
73 Recess
74 Covering region
75 Recess
76 Covering region
77 Recess
78 Covering region
79 Recess
80 Covering region
81 Protrusion
82 Reinforcement structure
84 Reinforcement structure
86 Reinforcement structure
88 Reinforcement structure
89 Reinforcement structure-proximal contact face
90 Annular body
92 Annular body-proximal contact face
100 Electric machine
102 Stator
A Direction of axial extent
K Motor vehicle
R Direction of radial extent
U Circumferential direction

The invention claimed is:

1. A rotor for an electric machine, comprising:
a rotor main body which has at least two poles between which, in a circumferential direction of the rotor, is disposed at least one pole gap;
a rotor shaft coupled in a rotationally fixed manner to the rotor main body; and
a support device comprising a covering body and an annular body, which annular body is different from the covering body, wherein:
the covering body is configured for covering at least regions of an end side of the rotor main body;
the annular body is braced in a direction of radial extent of the rotor both in relation to the rotor main body and in relation to the covering body;
the covering body has a through opening;
the rotor shaft at least in the regions is guided through the through opening;
the covering body has an annular central region which circumferentially encircles the through opening, and at least two covering regions that in the direction of radial extent of the rotor protrude from the central region;
a recess of the covering body in the circumferential direction of the rotor is disposed between the at least two covering regions; and
one covering region of the at least two covering regions covers, in the direction of axial extent of the rotor, at least in regions in each case one of the poles.

2. The rotor according to claim 1, wherein:
the covering body has at least one protrusion which is oriented in the direction of axial extent of the rotor and in the direction of the rotor main body and which is disposed on at least one of the covering regions and introduced into at least one corresponding receptacle opening of the rotor main body.

3. The rotor according to claim 1, wherein:
the covering body has at least one reinforcement structure which divides the recess between the at least two covering regions into at least two recess sub-regions, and in the direction of radial extent of the rotor is braced with the annular body.

4. The rotor according to claim 3, wherein:
the at least one reinforcement structure in a section plane oriented along a rotation axis of the rotor has an L-shaped cross section.

5. The rotor according to one of claim 3, wherein:
the at least two covering regions in the direction of radial extent of the rotor are spaced apart from the annular body, and
the covering body is supported on the annular body by way of the at least one reinforcement structure.

6. An electric machine for a motor vehicle comprising at least one rotor according to claim 1.

7. The electric machine according to claim 6, wherein:
the electric machine is configured as a current-excited synchronous machine.

8. A motor vehicle comprising at least one electric machine according to claim 6.

* * * * *